Sept. 2, 1952  T. K. GRAHAM ET AL  2,609,095
APPARATUS FOR SORTING HEAVY BARS
Filed Feb. 26, 1949  2 SHEETS—SHEET 1
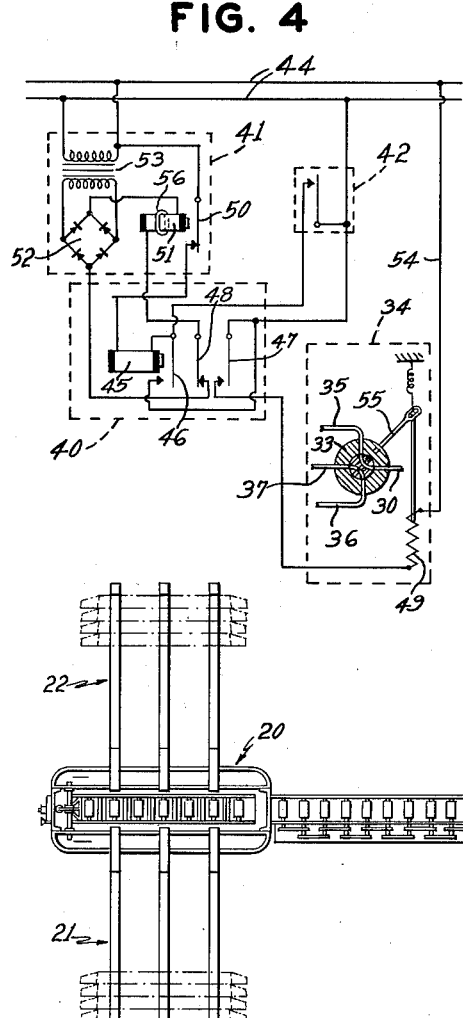
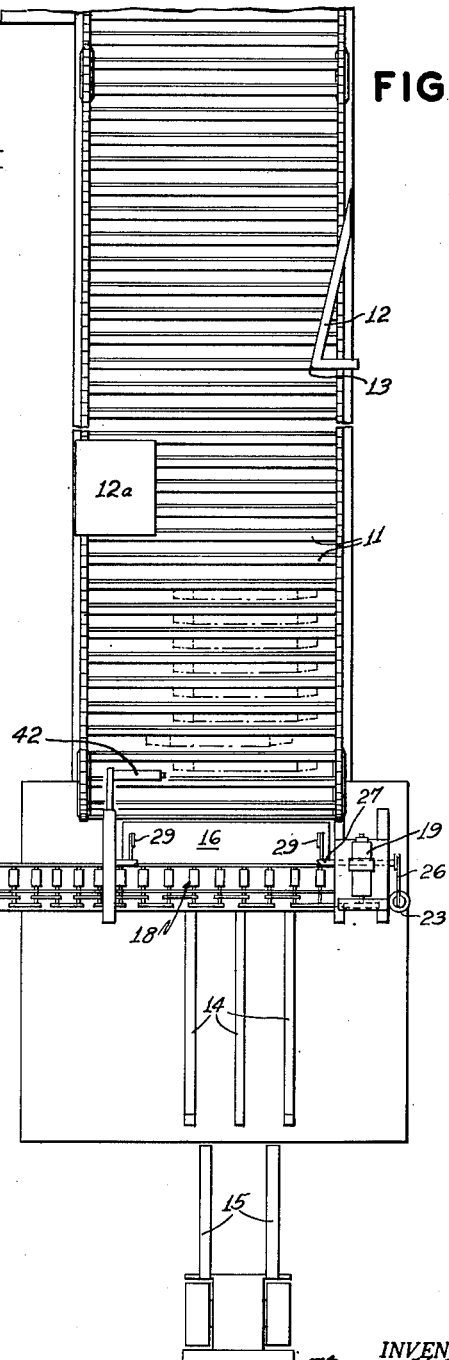
INVENTORS
Thomas K. Graham
Carl P. Etterer
BY
ATTORNEYS Sept. 2, 1952  T. K. GRAHAM ET AL  2,609,095
APPARATUS FOR SORTING HEAVY BARS
Filed Feb. 26, 1949  2 SHEETS—SHEET 2

INVENTORS
Thomas K. Graham
Carl P. Etterer
BY
ATTORNEYS

Patented Sept. 2, 1952

2,609,095

UNITED STATES PATENT OFFICE 2,609,095

APPARATUS FOR SORTING HEAVY BARS

Thomas K. Graham and Carl P. Etterer, Great Falls, Mont., assignors to Anaconda Copper Mining Company, New York, N. Y., a corporation of Montana Application February 26, 1949, Serial No. 78,572

2 Claims. (Cl. 209—72)

This invention relates to apparatus for sorting heavy bars. The new apparatus is especially useful for segregating heavy defective copper wirebars from like bars of satisfactory quality, and particularly reference is made below to its use for this purpose. It is apparent, however, that the apparatus may be adapted to the sorting and handling of a wide variety of heavy articles.

The new apparatus comprises a bar conveyor which serves the double purpose of carrying the bars from the place where they are made or stored, and of providing a place for a preliminary inspection to determine which bars should be segregated as defective. Means are provided for initially aligning the ends of all the bars on the conveyor. Bars that are to be segregated and separately collected are displaced by the inspector from this position of alignment, and the apparatus is devised to collect bars thus displaced separately from the bars which are allowed to remain in their position of initial alignment.

A fixed skid is mounted at the end of the conveyor in position to receive bars discharged therefrom. This skid collects all of the bars which travel the length of the conveyor in the position of initial alignment. To collect separately the defective bars that have been displaced from such position of alignment, a table overlying the fixed skid is mounted for movement either toward the conveyor into position to receive bars discharged over its end, or away from the conveyor and out of position to receive such bars. A motor is connected to the table for thus moving it, and such motor or other means normally holds the table away from position to receive bars from the conveyor. A switch through which the motor is controlled is mounted alongside the conveyor in position to be actuated by any bar displaced a predetermined distance from its position of initial alignment with the other bars. Thereby, when such a bar engages and actuates the switch, the motor is set in operation to move the table into position to collect that bar as it is discharged over the end of the conveyor.

The motor by which the table is operated is preferably a reversible pneumatic motor of the type comprising an air cylinder in which a piston may be moved from one end to the other by means of compressed air. Such a motor is connected to a source of compressed air through a reversing valve which is preferably solenoid operated. The valve is normally so positioned as to energize the pneumatic motor in a direction to hold the table out of position for receiving bars discharged over the end of the conveyor. The valve solenoid is connected to a source of electric power through a time delay relay, and this relay is in turn actuated by the switch mounted alongside the conveyor in position to be actuated by any bar displaced by a predetermined amount from its position of initial alignment as such bar arrives in position to be discharged over the end of the conveyor. When the switch is actuated, the time delay relay is energized, thereby energizing the valve solenoid and reversing the direction of energization of the pneumatic motor for a limited period of time determined by the time delay relay. In consequence, the table is brought into position to collect the bar which actuated the switch, and, then, at the expiration of the predetermined time interval, it is again moved away from the conveyor. The timing cycle of the time delay relay is preset so that each time the switch is operated, the table is brought into position to receive a bar from the conveyor and is withdrawn again before the next bar on the conveyor is in position to be discharged. Thereby the table collects only those bars which inspection has revealed to be defective and which have therefore been displaced from their original position of alignment with the other bars in a direction and to an extent sufficient to actuate the switch.

A preferred embodiment of the invention as applied to the sorting of copper wirebars is shown in the accompanying drawings, in which Fig. 1 is a plan of the sorting apparatus;

Fig. 4 is a wiring diagram of a control circuit.

Figure 2:
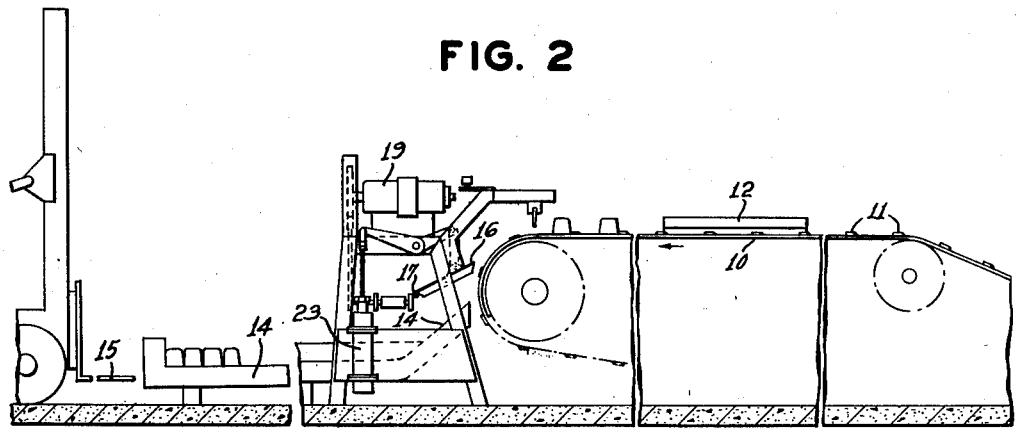
Fig. 2 is a foreshortened elevation of the sorting apparatus.

The apparatus shown in the drawings comprises a conveyor 10, which is advantageously a typical bosh conveyor such as is commercially used for collecting freshly cast copper wirebars and carrying them from the water-filled bosh in which they have been cooled from a red heat. The conveyor is provided with a series of transverse cleats 11 which prevent the heavy bars from sliding down the inclined surface of the conveyor emerging from the bosh. In normal operation of the conveyor, only one bar rests on the conveyor between each adjacent pair of cleats, so that the minimum spacing from bar to bar along the conveyor is at least equal to the distance between cleats.

The bars rest on the conveyor transversely. A cam plate 12, which is rigidly mounted on the conveyor frame at some convenient point above the bosh from which the conveyor emerges, overlies the upper surface of the conveyor near one side edge thereof and extends at an acute angle to the direction of travel of the conveyor. The cam plate engages the end of each bar which the conveyor carries by it, and by wedge action it forces the bar laterally across the conveyor to a position such that the bar end comes into alignment with the innermost projecting end 13 of the cam plate. Thereby the ends of all of the bars are brought into alignment with one another, all being spaced inwardly from the side edge of the conveyor by the same distance that the end 13 of the cam plate extends inwardly therefrom.

The conveyor moves slowly enough so that the bars, after they pass the cam plate and before they reach the end of the conveyor, may be inspected for defects. The inspector pulls any bars found to be defective laterally across the conveyor out of alignment with the other bars. This work may be done manually, or if the bars are too heavy to be handled manually it may be done mechanically. A displacement of a defective bar by a distance of about six inches, more or less, from its position of initial alignment is all that is required. A stop plate 12a may be arranged overlying the side edge of the conveyor, on the side opposite the cam plate 12, to serve as a guide to indicate a suitable distance through which a defective bar should be displaced laterally.

A fixed skid 14 is mounted at the end of the conveyor in position to receive bars discharged therefrom. All bars found to be free from defects collect on this skid and are removed in groups by the carrying forks 15 of a fork lift truck.

Defective bars are separately collected, as they are discharged over the end of the conveyor, by a table 16 which directly overlies the fixed skid 14. The table 16 is mounted on a hinge 17 for movement through an arc between upper and lower limits. When raised to the upper limit of its movement, the table is withdrawn far enough from the end of the conveyor so as not to intercept a bar discharged over the end thereof, and accordingly the bar falls to the fixed skid 14. With the table at the lower limit of its arcuate path of travel, however, it is in position to receive a bar discharged from the conveyor. By lowering the table 16 whenever a defective bar comes into position to be discharged over the end of the conveyor, and by then raising it again, the defective bars are separately collected from the bars that are free from defects. The defective bars are delivered by the table to a live roller conveyor 18, the rolls of which are driven by a motor 19, and is carried thereby to a dumper 20 (Fig. 1) by which they are dumped into either of two cradles 21 and 22. When a sufficient number of defectives bars have been collected, they may be removed from the cradles for further processing to correct the defects, or for remelting.

The table 16 is moved between its upper and lower limits of travel by a pneumatic motor 23. The motor is advantageously a conventional double-acting (reversible) air hoist comprising a cylinder in which a piston is moved back and forth by compressed air. A connecting rod 24 connected to the piston of the air motor is joined by a link 25 to a primary lever 26 keyed to a shaft 27. One or more secondary levers 28, also keyed to the shaft 27, are each connected by a link 29 to the table 16. When the piston of the pneumatic motor 23 is at its lowest limit of travel, the table 16 is raised to the upper limit of its travel out of position to intercept a bar discharged over the end of the conveyor; and when the piston of the pneumatic motor is at the upper limit of its travel, the table is lowered into position to intercept a bar being discharged from the conveyor.

Figure 3:
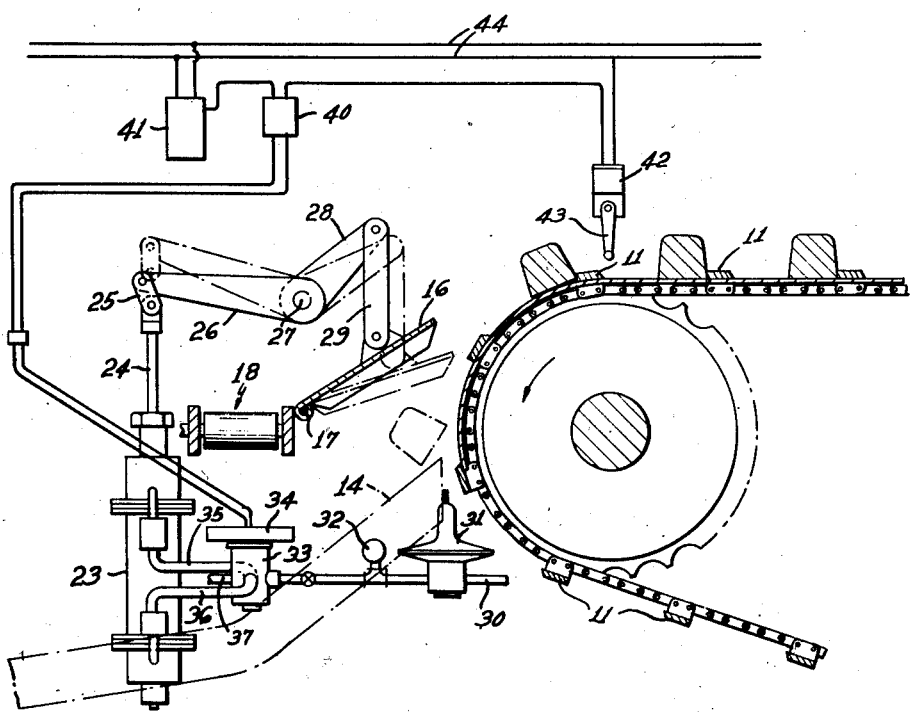
Fig. 3 is an elevation, on an enlarged scale, of the apparatus at the end of the conveyor.

The pneumatic motor is energized by compressed air delivered to it from a source through an air supply pipe 30. A pressure regulator 31 and pressure gauge 32 are advantageously connected in series with the supply pipe 30. A four-way reversing valve 33 operated by a solenoid 34 is provided to direct the compressed air through an upper air inlet pipe 35 into the motor 23 above its piston, or through a lower air inlet pipe 36 into the motor below its piston, in either case connecting the other inlet air pipe to an exhaust port 37. When the valve 33 is turned to admit compressed air to the motor through the upper inlet pipe 35 and to connect the lower pipe 36 to the exhaust port, the piston within the air motor is forced to the lower limit of its travel and the table 16 is raised to the upper position shown in full lines in Fig. 3. When the valve 33 is turned to admit compressed air through the lower inlet pipe 36 and to connect the upper inlet pipe 35 to the exhaust port, the piston is forced to the upper limit of its travel and the table 16 is moved to the lower position indicated by dotted lines in Fig. 3.

The solenoid 34 of the reversing valve is actuated through a main relay 40, which is itself controlled by a time delay relay 41 and which is energized through a normally open control switch 42 which may be closed by actuation of a switch lever 43. The switch 42 is mounted alongside the conveyor 10 near its discharge end in such position that its actuating lever 43 is engaged by any bar coming into position to be discharged from the end of the conveyor, and which has been displaced by the inspector from its position of original alignment with the other bars. Upon engagement of the switch lever by such displaced bar, the relay 40 is energized from a power supply line 44, and the valve solenoid 34 is thereby energized, shifting the valve 33 from its normal position to the position in which compressed air forces the piston of the air motor 23 to its upper limit of travel and effects lowering of the table 16. The valve solenoid continues to be energized for a length of time determined by the adjustment of the time delay relay 41, and during that period of time the table 16 remains in its lowered position. At the end of the timer period the valve solenoid is de-energized, whereupon the valve is returned to its original position and the air motor is reversed to lift the table 16 to its raised position. The time interval for which the timer relay 41 is set is advantageously about equal to the length of time required for the conveyor to advance through a distance equal to the separation of the cleats 11. Thereby the time during which the table is held in its lowered position is just long enough for it to intercept the one defective bar that last actuated the switch 42, after which it is again lifted to its upper position before the next bar is discharged from the conveyor, in case such bar is free from defects and should therefore fall to the skid 14.

A satisfactory control circuit connecting the valve solenoid 34, the relays 40 and 41 and the switch 42 is shown diagrammatically in Fig. 4. The relay 40 includes a solenoid 45 which operates two normally opened contacts 46 and 47 and a normally closed contact 48. The valve solenoid winding 49 is connected to the power line 44 through one of the normally opened contacts 47. One terminal of the relay solenoid 45 is connected to one side of the power line 44 through a parallel circuit one leg of which includes the switch 42 and the other leg of which includes the other normally opened relay contact 46. The other terminal of the relay solenoid is connected to the other side of the power supply line through a timer relay contact 50 which is held closed so long as a timer solenoid 51 is energized. This timer solenoid is supplied with direct current from a rectifier 52 through the normally closed contact 48 of the relay. The rectifier is energized from the power line 44 through a transformer 53.

Operation of the control circuit is as follows: The circuit is shown in Fig. 4 in the position in which the solenoid coil 49 is de-energized and in which therefore the valve 33 is held by a spring 54, acting through a lever 55, in the position for admitting compressed air from the supply pipe 30 through the upper air inlet pipe 35, and for connecting the lower pipe 36 to the exhaust port 37. Consequently the table 16 is held by the motor 23 in its raised position. Now, whenever a bar that the inspector has displaced from its position of initial alignment with the other bars approaches the end of the conveyor, it engages the switch lever 43 and momentarily closes the switch 42. Thereby a circuit connecting the relay solenoid 45 to the power supply line 44 is completed through the switch 42 and through the timer contact 50. In consequence the normally open relay contacts 46 and 47 are closed, and the normally closed relay contact 48 is opened. This at once completes a circuit from the power line through the relay contact 47 and valve solenoid winding 49 and effects a reversal in the position of the valve 33, connecting the air supply pipe 30 to the lower air inlet pipe 36 and connecting the upper inlet pipe 35 to the exhaust port 37. The table 16 is thereupon moved to its lower position by the motor 23. At the same time the circuit through the relay solenoid 45 is closed through the relay contact 46, so that if now the switch 42 is reopened, the relay solenoid is not on that account de-energized. The circuit through the timer solenoid 51 is broken as a result of opening the normally closed relay contact 48, but the timer relay contact 50 does not open at once because when the magnetic field in the timer solenoid 51 begins to decay, a current tending to oppose such decay is generated in a copper ring 56 surrounding the solenoid. The effect of such current in the ring is to delay the decay of the magnetic field in the timer solenoid for an appreciable period of time. After a lapse of some time interval, however, the magnetic field does decay to the point at which the timer contact 50 opens, and when this occurs, the relay 45 is at once de-energized. Thereupon the circuit through the valve solenoid winding 49 is broken and the valve 33 is returned by the spring 55 to its original position, causing the table 16 to be brought by the motor 23 to its raised position. Simultaneously the circuit through the timer solenoid 51 is closed again through the normally closed relay contact 48, once again causing the timer contact 50 to close; but now the relay solenoid 45 remains de-energized because both the switch 42 and the normally opened relay holding contact 46 are both open. Thus the circuit is once more in the position to go through the same cycle of operations.

It is evident that the length of time for which the table 16 is held in its lowered position for intercepting a bar discharged from the conveyor is determined by the time required for decay of the magnetic field in the timer solenoid 51. This time interval should be just long enough for the table to receive the one bar that last actuated the switch 42, and may be controlled by increasing or decreasing the number or size of the copper rings 56. In lieu of the copper rings, the timer solenoid may include a separate timer winding in which the current opposing decay of the magnetic field is induced. The rate at which this current is allowed to dissipate, and hence the timing cycle of the timer, may be controlled by short-circuiting such timer winding through an adjustable high resistance potentiometer or rheostat.

The particular construction of the reversing valve, the timer, or the relay is not a part of the present invention. A suitable form of valve, timer and relay has been shown and described solely for the purpose of providing a full disclosure of a complete operative apparatus. There are many different types of reversing valves and relays, and many different types of timers (including mechanical timers and electronic timers in addition to electromagnetic timers such as that described above), available on the market and any of them may be adapted for use in the apparatus of the invention.

We claim:

1. Apparatus for sorting heavy bars comprising a bar conveyor, means for initially aligning the ends of the bars on the conveyor, a skid fixedly mounted in position to receive bars discharged over the end of the conveyor, a table overlying the fixed skid and hingedly mounted for movement through an arc downwardly into and upwardly away from position to intercept bars discharged over the end of the conveyor, a reversible pneumatic motor having a piston movable between limits connected to said hinged table, a source of compressed air connected to said motor through a solenoid reversing valve, means normally holding the valve in position for energizing the motor in a direction to hold the table in its upward position, and a switch connected to the valve solenoid for shifting the valve into position to energize the motor in a direction to move the table to its downward position, said switch being positioned alongside the conveyor in position to be actuated by a bar that has been displaced laterally of the conveyor a predetermined distance from its position of initial alignment with the other bars as said bar comes into position to be discharged over the end of the conveyor but being out of position to be actuated by any bar that remains in said position of initial alignment, whereby the table is lowered to intercept each such displaced bar and separate it from bars received by the fixed skid.

2. Apparatus for sorting heavy bars comprising a bar conveyor, means for initially aligning the ends of the bars on the conveyor, a skid fixedly mounted in position to collect bars discharged over the end of the conveyor in their initial aligned positions, and means for separately collecting bars displaced on the conveyor a predetermined distance from their position of initial alignment comprising a table hingedly mounted for movement through an arcuate path downwardly to a lower limit into position to receive a bar discharged from the conveyor and upwardly to an upper limit out of position to receive a bar, a reversible pneumatic motor connected to said table for moving it between the limits of its travel, a source of compressed air connected to said motor through a solenoid reversing valve, means normally holding said valve in position for energizing the motor in a direction to hold the table at its upper limit of travel, a time delay relay connected to the valve solenoid and serving when actuated to change the position of said valve to energize the motor in the reverse direction to hold the table for a limited predetermined time at its lower limit of travel, and a normally open switch connected to said relay and serving when closed to actuate said relay, said switch being mounted alongside the conveyor in position to be engaged and closed by a bar displaced from its position of initial alignment as such bar comes into position to be discharged over the end of the conveyor.

THOMAS K. GRAHAM.
CARL P. ETTERER.

REFERENCES CITED

The following references are of record in the file of this patent:

UNITED STATES PATENTS

| Number | Name | Date |
|---|---|---|
| 655,553 | Heard | Aug. 7, 1900 |
| 1,306,067 | Krause | June 10, 1919 |
| 1,445,899 | McGregor | Feb. 20, 1923 |
| 2,065,205 | Appleyard | Dec. 23, 1936 |
| 2,293,500 | Fox | Aug. 18, 1942 |
| 2,433,685 | Dowell | Dec. 30, 1947 |